United States Patent
Green

[11] Patent Number: 6,031,737
[45] Date of Patent: Feb. 29, 2000

[54] AC-DC POWER SUPPLY

[75] Inventor: Andrew William Green, Malsburg-Marzell, Germany

[73] Assignee: Aquagas New Zealand Limited, New Zealand

[21] Appl. No.: 09/051,991

[22] PCT Filed: Oct. 24, 1996

[86] PCT No.: PCT/NZ96/00119

§ 371 Date: Sep. 1, 1998

§ 102(e) Date: Sep. 1, 1998

[87] PCT Pub. No.: WO97/17753

PCT Pub. Date: May 15, 1997

[30] Foreign Application Priority Data

Oct. 24, 1995 [NZ] New Zealand ............................ 280317

[51] Int. Cl.[7] .................................................. H02M 5/458
[52] U.S. Cl. ................. 363/37; 363/95; 363/131
[58] Field of Search .................................. 363/17, 34, 37, 363/40, 44, 84, 95, 56, 125, 131

[56] References Cited

U.S. PATENT DOCUMENTS

| | | | |
|---|---|---|---|
| 4,084,205 | 4/1978 | Bohnert | 361/76 |
| 4,567,420 | 1/1986 | Beck | 318/803 |
| 4,833,584 | 5/1989 | Divan | 363/37 |
| 4,931,919 | 6/1990 | Nguyen et al. | 363/37 |
| 5,138,544 | 8/1992 | Jessee | 363/43 |
| 5,189,602 | 2/1993 | Callier et al. | 363/28 |
| 5,255,178 | 10/1993 | Liberati | 363/37 |
| 5,587,892 | 12/1996 | Barrett | 363/44 |
| 5,631,818 | 5/1997 | Johnson et al. | 363/126 |
| 5,748,458 | 5/1998 | Ochiai | 363/17 |
| 5,771,162 | 6/1998 | Kwon | 363/97 |

*Primary Examiner*—Adolf Deneke Berhane
*Attorney, Agent, or Firm*—Akin, Gump, Strauss, Hauer & Feld, L.L.P.

[57] ABSTRACT

An AC-DC power supply system for receiving a three phase mains supply and outputting a transformed DC supply. The power supply unit has a rectifier circuit (30) providing an output to a three phase inverter circuit (40) to generate a pseudo AC three phase output of higher frequency than the AC supplied to the rectifier circuit (30). A three phase transformer (60) receives the pseudo AC three phase output and transforms the output to a three phase rectifier circuit (70) to generate the output DC supply. The inverter circuit (40) provides a three leg bridge structure with each leg having a switching device one of which is used to provide a phase reference whereas the other two legs control the relative phase shift on each leg to reduce the phase shift relative to the phase reference on one leg and increase the phase shift relative to the phase reference on the other leg.

12 Claims, 7 Drawing Sheets

AC-DC POWER SUPPLY

BACKGROUND TO THE INVENTION

This invention relates to an AC-DC power supply and, in particular, although not necessarily solely, to a power supply that is suited to provide the necessary DC supply for an electrolysis cell unit for the electrolysis of water to liberate hydrogen and oxygen gas. However, generally the invention is suited to any particular application where an AC mains supply is available but a DC supply is required.

The full wave rectification of a multi-phase AC power supply to produce a pseudo DC output is commonly known. For a 240 V, 50 Hz single phase mains power supply, the average DC voltage produced by a full wave (H-bridge rectifier) is 216 V. However, loads requiring a DC power supply typically require much lower voltages.

For electrolysis cell units such as the applicant's AQUA-GAS 3 gas generator, a DC voltage in the order of 33 V is required. In order to accommodate this requirement, it has conventionally been the case that the AC mains supply is transformed to an appropriate lower level before rectification so that the desired output DC voltage is realised. The disadvantage with such a technique is that mains frequency transformers of a power rating above 10 kW become physically large and heavy due to magnetic circuit and leakage reactance considerations.

Another known technique to generate a desired DC supply from a fixed mains AC supply is to utilise controlled switching devices in the rectifier bridge. These may be devices such as power transistors, SCRs or GTOs. The average DC output can be adjusted by controlling the turn-on (and possibly also the turn-off) time for the switching devices. The disadvantage with this technique is that the output wave form is "lumpy" even if smoothing storage capacitors are used across the DC output. Certain loads are sensitive to time-varying changes in the DC voltage level. This includes such DC machines as electrolysis cell units. Some may be sufficiently sensitive as to reach the point of not operating satisfactorily with such an output wave form.

There are other problems associated with a known power supply of the type having a single phase AC supply, a step-down transformer and a controlled rectifier bridge circuit. These include high transformer inrush current on start-up and a susceptibility to phase imbalances if two phases of a nominal three phase supply are utilised rather than one phase and neutral, or all three phases.

OBJECT OF THE INVENTION

Therefore, it is an object of the present invention to provide an AC-DC power supply that overcomes some of the disadvantages of the prior art or at least provides the public with a useful choice.

SUMMARY OF THE INVENTION

Accordingly, in a first aspect, the invention consists in an AC-DC power supply comprising:
  a three phase rectifier circuit generating a first rectified output in response to an input voltage;
  a controlled three phase inverter circuit receiving the first rectified output and generating a pseudo AC three phase output having a frequency higher than the frequency of the three phase AC supply supplied to the rectifier circuit;
  a three phase transformer receiving said pseudo AC three phase output; and
  a second three phase rectifier circuit receiving the transformed pseudo AC three phase output from the transformer and generating the output DC supply.

Accordingly, in a second aspect, the invention comprises a controllable three phase inverter circuit receiving a DC supply to produce a three phase pseudo AC output supply wherein the inverter comprises:
  a three leg bridge structure;
  each leg of said bridge structure comprising at least one controllable switching device;
  at least one switching device of one of said legs forming a phase reference; and
  wherein the voltage of the inverter circuit is controlled by means of Phase Modulation.

Accordingly, in a third aspect, the invention comprises a soft-switching three phase inverter circuit receiving a DC input supply and generating a pseudo AC three phase output supply wherein said inverter circuit comprises:
  at least two switching devices per phase;
  each said switching device having a capacititve element connected in parallel across it and each phase of the output supply including an inductive element;
  a respective capacitive element and inductive element of each phase forming a LC resonant circuit; and
  wherein the turn-off of each said switching element is controlled to have a deadtime between switching phases during which time said LC resonant circuit causes the next sequential switching element that is to be turned on to have substantially zero voltage across it at the time of switching.

Accordingly, in a fourth aspect, the invention comprises a method for controlling the output voltage of a three phase inverter circuit comprising the steps of:
  assigning a first phase as a phase reference;
  controlling the relative phase shift of one of the other two phases so that a phase difference is reduced; and
  controlling the relative phase shift of the third phase so that the phase difference between the third phase shift and the first phase is increased.

Further aspects of this invention will become apparent to those skilled upon reading the description of the preferred embodiments.

BRIEF DESCRIPTION OF THE DRAWINGS

Preferred embodiments of the present invention will now be described with reference to the accompanying drawings in which.

DETAILED DESCRIPTION OF PREFERRED EMBODIMENTS

Figure 1:
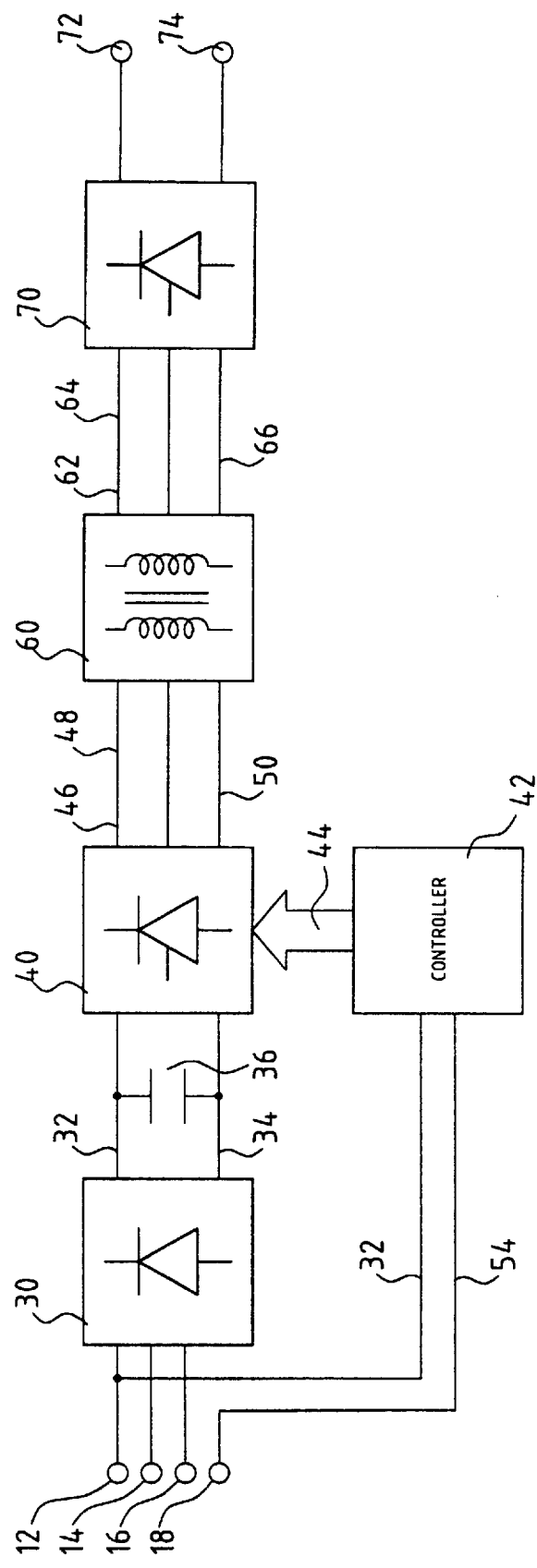
FIG. 1; is a schematic block diagram of an AC/DC power supply.

FIG. 1 shows the generalised block diagram of a power supply 10 comprised of a number of cascaded stages. The power supply 10 receives a three phase AC supply on input terminals 12,14,16. The supply typically is a readily available mains supply, which in New Zealand is a 400 V (phase to phase), 50 Hz supply. Clearly other three phase supply voltages and frequencies are contemplated including the 200 V, 60 Hz supply common in the United States. The neutral reference potential of the mains power supply also is received on terminal 18.

A three phase rectifier stage 30 receives the mains supply rectifying it to a DC level on the output DC bus 32,34 that is supported by a storage capacitor 36 which tends to smooth the voltage waveform. A link inductor also can be included to improve the input power factor. A controlled inverter 40 receives and chops the rectified DC supply to fabricate a pseudo three phase AC output at a frequency higher (and typically several orders of magnitude higher) than the mains frequency. The switching devices of the inverter 40 are controlled by control circuitry 42 coupled to the inverter 40 by multiple gating lines 44. The control circuitry 42 also receives a reference phase-to-neutral voltage from one of the phases of the AC supply and the mains supply neutral, as indicated by the interconnecting lines 52,54.

The three phase pseudo AC output from the inverter 40 is carried by output lines 46,48,50 to a (typically) step-down high frequency transformer 60. The transformed pseudo AC voltage appearing on the output lines 62,64,66 from the transformer in turn passes to a further rectifier stage 70, by which the DC output voltage for the power supply 10 is generated and available at the output terminals 72,74.

The transformer 60 in the preferred form has a fixed turns ratio, and therefore only approximates the desired maximum output voltage appearing at the output terminals 72,74. Control over the output voltage between the full nominal output and a reduced or regulated value thus is effected by the control circuitry 42 controlling gating of the controlled switching devices of the inverter 40.

As previously noted, an advantage of utilising a three phase mains supply rather than a single phase mains supply is that the effects of phase imbalance are eliminated.

A description will now be given of a particular embodiment of a AC/DC power supply that is suitable for use with the present applicant's AQUAGAS generator. This is a gas generator that can deliver 4.3 m³ of admixed hydrogen and oxygen gas per hour, correspondingly consuming 17 liters of water. A gas generator of this capacity requires approximately a 10 kW, 300 A, 33 V DC power supply. It is to be understood, however, that the present invention is not limited to use with an electrolysis gas generator, rather equally has applicability in all instances where a controlled DC supply is required and a three phase supply is available. Other such applications can include electric welding, electroplating, control of DC machines, battery charging, uninterruptable power supplies and the like.

Figure 2:
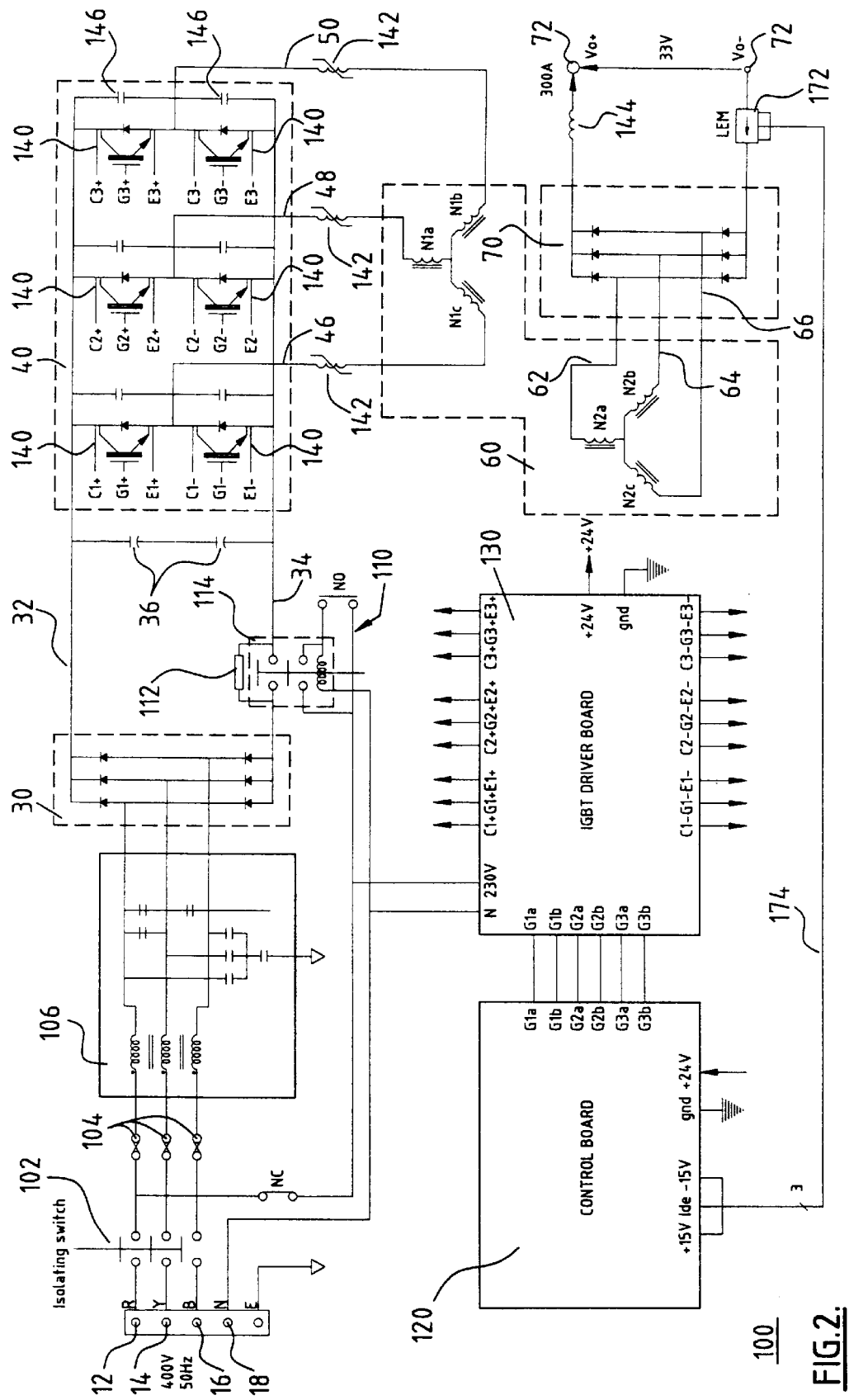
FIG. 2; is a schematic circuit diagram of the power supply of FIG. 1.

FIG. 2 shows a detailed schematic circuit diagram for a power supply 100 embodying the invention. Component parts common with those shown in FIG. 1 have been referred to by like-reference numeral.

The power supply 100 is normally rated at 10 kW (300 A, V DC), receiving a 400 V, 50 Hz three phase AC mains supply. The AC supply passes by an isolating switch 102 and in-line fuse links 104, and then to a conventional RFI filter circuit 106. The filtered three phase AC supply then passes to the rectifier stage 30. The diodes constituting the rectifier stage 30 must be rated to withstand an inverse peak voltage of at least 540 V. The DC bus voltage level is 540 V DC.

A soft-start circuit 110 forms a component part of the zero DC reference 34 of the DC bus. This circuit acts on operation of the isolating switch 102 to establish supply so that the bypass resistor 112 limits the inrush current due to transformer charging, and after a period of time is short-circuited by operation of the controlled contactor 114 caused by closing of the normally opened switch 116 that in turn is controlled by the control board 120.

The controller inverter 40 is constituted by a full wave three phase bridge circuit having six switching devices, in one preferred form being Insulated Gate Bipolar Transistors (IGBTs). One particularly preferred IBGT is the FUJI 6MB150F120 module containing six 50 A, 1200 V IGBT switching devices. In FIG. 2, the collector, gate and emitter electrodes are shown. Switching of the IGBT devices is under control of the IGBT driver board 130, in turn under control of the control board 120. The IGBT driver board 130, in turn under control of the control board 120. The IGBT devices 140 have have their gate electrodes switched in a manner to synthesize a pseudo AC (square-wave) three phase output lines 44–48 of the inverter 40 contain in-line inductors 142, the purpose of which presently will be described.

In a particularly preferred form, the transformer 60 is a coaxially wound, ferrite cored type in a star-star configuration. The turns ratio of the transformer 60 preferably is 13.5:1, meaning that the nominal phase-phase peak voltage on the primary of ±540 results in ±40 V on the secondary. The 16 kHz, 31 V rms three phase output from the transformer secondary, appearing on the output lines 62–66, is provided to the further rectifier 70 to fabricate the output DC supply of a nominal 33 V level on the output terminal 72,74. The rectifier stage 70 is constituted by fast recovery diodes, such as 6 SGS Thomson BYV225-200 diode modules. Each module contains two 100 A 200 V diodes with reverse recovery times of 80 ns, which are operated in parallel. The $V_0$+ output terminal 72 is preceded by an in-line inductor 144 that serves the purpose of smoothing the small AC components in the output DC current waveform.

Figure 3B:
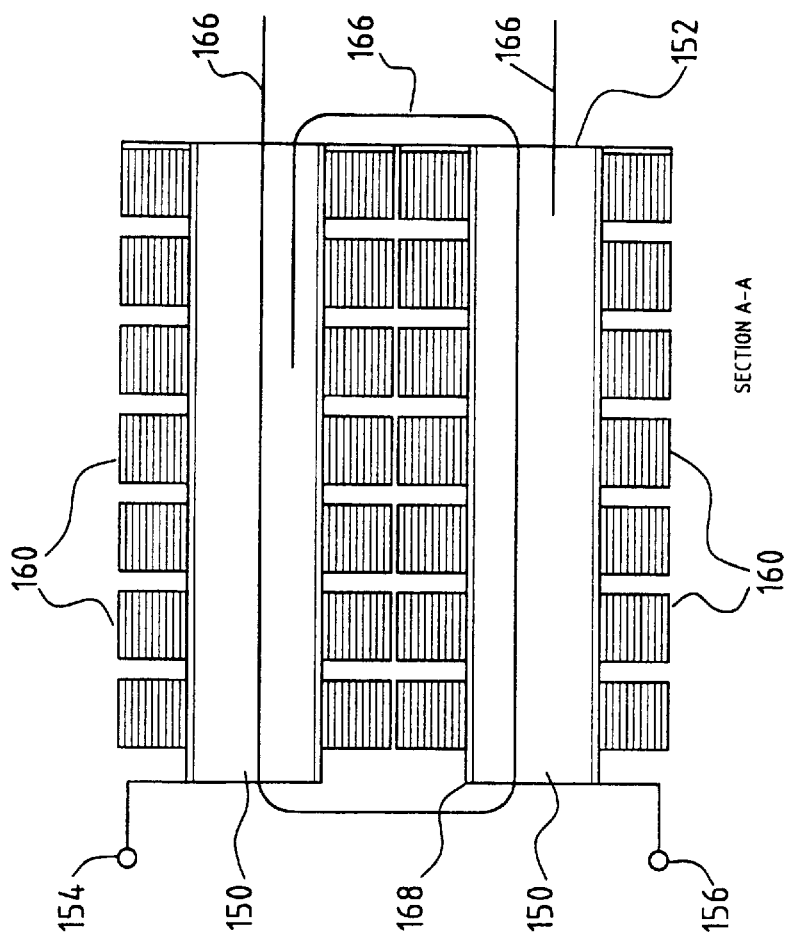
FIGS. 3a and 3b respectively are a plan view and a cross-sectional view of a coaxial three phase transformer.
Figure 3A:
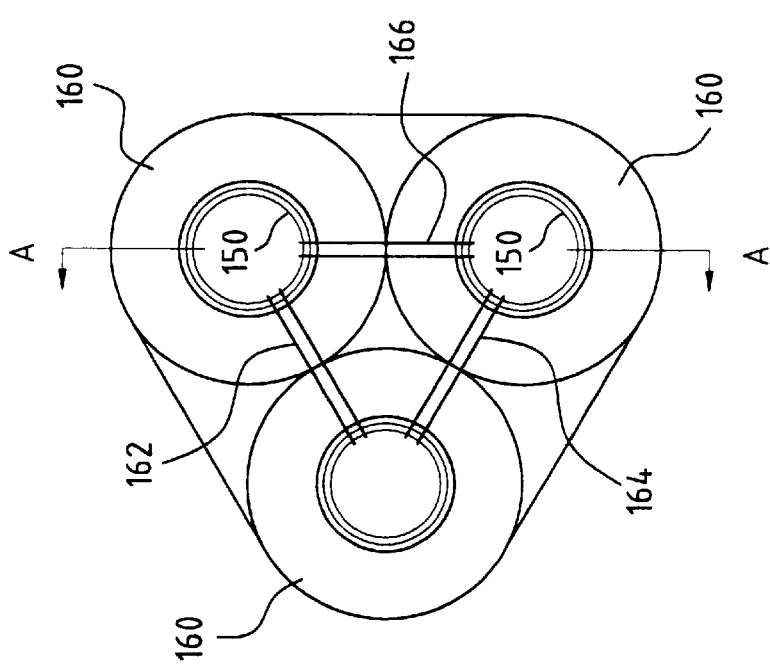

Returning to the co-axial transformer 60, reference is made to FIGS. 3a and b, respectively a plan view and cross-sectional view of an embodiment of the transformer 60. The transformer is constructed of three copper tubes 150 soldered into three holes cut in a copper plate 152 that forms the three phase neutral (star) point. The free ends of the tubes 150 form the transformer output (secondary) terminals 154, 156, 158. The copper tubes 150 thus form a single turn secondary winding. Ferrite toroids are threaded over the respective copper tube 150.

The three primary windings 162, 164, 166 are wound through and between an adjacent pair of copper tubes 150. A simplified representation of the primary winding 166 is shown in FIG. 3b for clarity. The inner circumference of each of the copper tubes 160 is shown in FIG. 3b for clarity. The inner circumference of each of the copper tubes 160 further includes an insulating (mylar) sleeve 168 to prevent short-circuiting of the primary winding to the secondary winding formed by the respective tube. The primary winding to the secondary winding are constructed of 5 mm² litz wire (1024 strands×40 AWG wire) and enveloped with an appropriate form of heatshrink sleeving.

The choice of a three phase configuration means that the current per secondary winding is reduced over a single phase implementation. This is an important advantage for several reasons. At 300 A, a considerable cross-sectional conductor area is required and this is difficult to achieve given that the depth of copper at 16 kHz is only 0.5 mm. Furthermore, if the transformer output is to be rectified, another difficulty arises in that fast recovery diodes presently are only readily available in modules with ratings of up to 200 A. By use of the three phase co-axial transformer, an output rating of 300 A is divided across the three phases.

The use of a high frequency transformer allows an equivalent power rating to be achieved before a transformer that is an order of magnitude less heavy than a conventional low frequency transformer, and perhaps for one half of the price. This is because for a minimised core area, and a maximised voltage, either the frequency or the turns must be increased. Increasing the number of turn leads to an increase in leakage inductance and hence a large voltage drop through the transformer.

One version of the transformer 60 tested as a component part of the power supply shown in FIG. 2 had approximate dimensions of 200×150×150 mm. Measurements on such a transformer indicated that the coupling factor from the primary to the secondary was 99.95%, thereby indicating a leakage inductance of only 0.05% of the primary inductance. With a higher-length-to-width ratio, an even higher coupling factor of approximately 99.99% would be obtained.

The three phase inverter 40 shown in FIG. 2 is hard-switched. The means that at the instant of switching on, each transistor 140 will have a large voltage dropped across it, and this voltage will still be present as the current through the transistor increases. When switching off, the voltage across the transistor will start rising before the current has fallen to zero. The power dissipated in each transistor due to switching losses is thus proportional to the switching frequency, and so total losses tend to impose an upper limit on the switching frequency of any hard-switched converter.

In order to improve the efficiency and reduce RFI of the power supply 100, and to provide the possibility of increasing the switching frequency a soft-switching technique is applied to the three phase full bridge topology. A small (for example 4.7 nF) capacitor 146 was connected across/in parallel with each of the transistors 140. Zero voltage turn-on is achieved because the voltage across each transistor is slower to increase. The series leakage inductance of the transformer primary maintains a residual current after a transistor has been turned off. It is this residual current that charges up the capacitor across a transistor that has turned off, whilst also discharging the capacitor across the other transistor of that same phase. Thus by the time the deadtime (i.e. the time between turning off one transistor of a phase and turning on another, being about 2 micro seconds for a 15 kHz converter) has expired, the diode 148 across the relevant transistor 140 that is about to be turned on is forward biased, giving a zero voltage turn-on characteristic for the transistor.

Figure 4A:
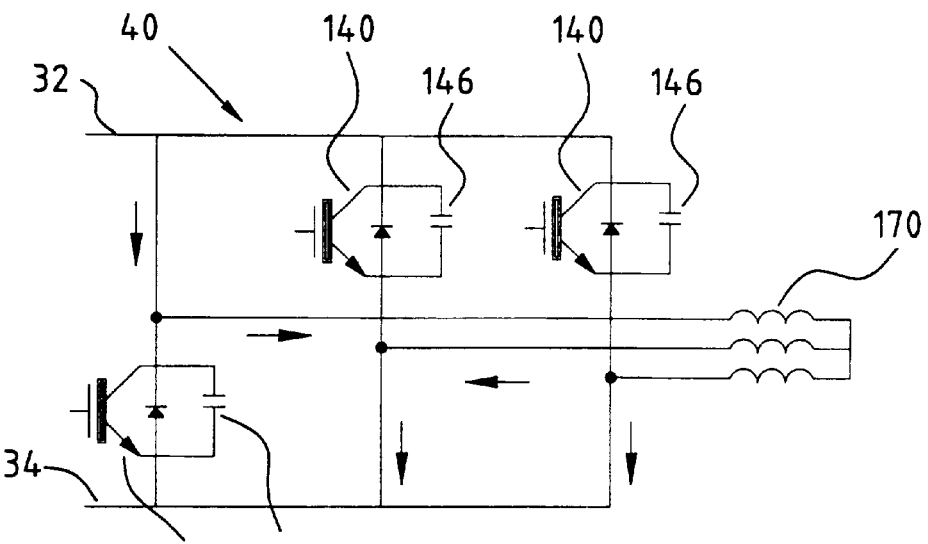
FIGS. 4a to 4c are diagrams of the switching state for the controller inverter stage.
Figure 4B:
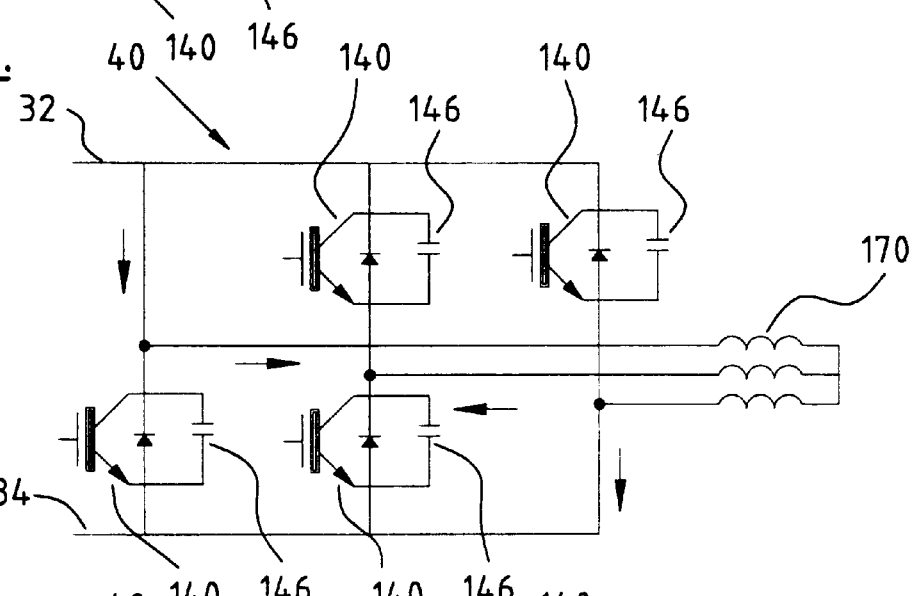
Figure 4C:
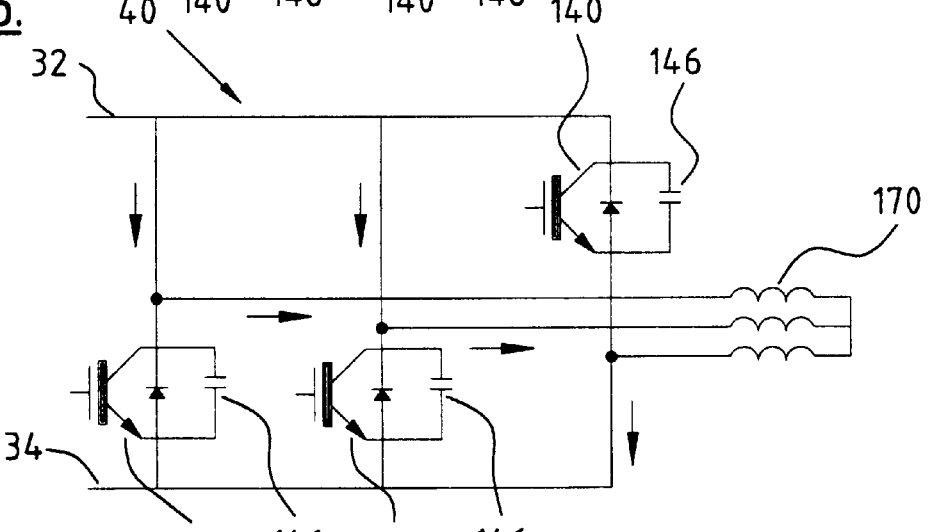

This process is further explained with reference to FIGS. 4a–4b, which exemplify in time of transition from the 100 state (phase A high, phases B and C low) to the 110 state (phases A and B high, phase C low), including the deadtime period after the low side transistor 140 of phase B has been switched off, but before the high side transistor has been switched on. The arrows show the current flow due to the simplified load that is represented as an inductor 170. In FIG. 4b, the current into phase B from the load 170 services to charge the lower capacitor 146 which is initially discharged and to discharge the top capacitor 146 prior to phase C switching high. In order for zero voltage turn-on to be achieved, the energy stored in the inductor 170 must be greater than in the respective capacitor 146.

The embodiment of the co-axial transformer 60 previously described has insufficient leakage inductance to satisfy this condition, in which case a saturable inductor 142 was introduced in series with each of the transformer primary windings 162–166. This arrangement provides the necessary inductance to discharge the respective parallel capacitor 146 prior to the corresponding transistor 140 switching on, but then saturates during full current flow, thus introducing no additional voltage drop.

As is apparent, the soft switching regime does not form a part of the controlling functions effected by the control board 120.

Also as previously discussed, control over the output DC voltage occurs by way of control of the gating of the transistors 140 that constitute the controllable inverter 40. This function ultimately is achieved by the control board 120. In particular, output DC voltage control is achieved by a phase shift output control technique.

Figure 5:
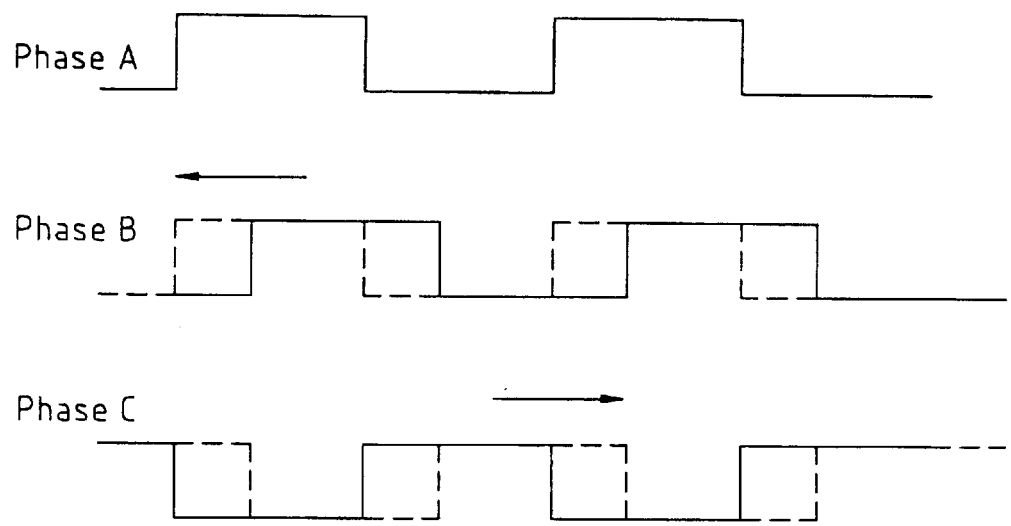
FIG. 5; shows respective phase shift between the phases of the controller inverter output.

As shown in FIG. 5, one of the phases of the inverter 40 (phase A") acts as the phase reference. For the full output voltage from the inverter 40, the nominal phase difference between the phase A, phase B and phase C is 120° respectively. This output voltage level can be adjusted by adjusting the relative phase difference between each of the phases, thus causing partial voltage cancellation and thereby reducing the rms output of the inverter 40. In accordance with the present technique, the phase adjustment is such that phase B is phase retarded—the relative phase difference to phase A becomes less—while phase C is phase advanced in that the relative phase difference to phase A increases, as shown in FIG. 5.

The following table indicates typical phase shifts for phases B and C over the controlled output DC voltage (nominal +120° and +240° phase differences) to reference phase A, for a 540 V DC bus and 200 A load.

| Output Voltage | Phase B | Phase C |
| --- | --- | --- |
| 33 | 99° | 261° |
| 30 | 90° | 270° |
| 27 | 81° | 279° |
| 24 | 72° | 288° |
| 21 | 63° | 297° |
| 18 | 54° | 306° |
| 15 | 45° | 315° |

Apart from providing for the selection of a desired output DC voltage, this technique also is utilised in providing output current regulation by means of a feedback mechanism, represented in FIG. 2 by a current sensor 172 having connection with the control board 120 by signal 174. The control board 120 retains reference values against which the feedback values are compared for the purposes of effecting adjustment to gating of the transistors 140 of the inverter 40. If the output DC voltages reduce, it follows that due to the resistive nature of the load the current will concomitantly reduce.

Figure 6:
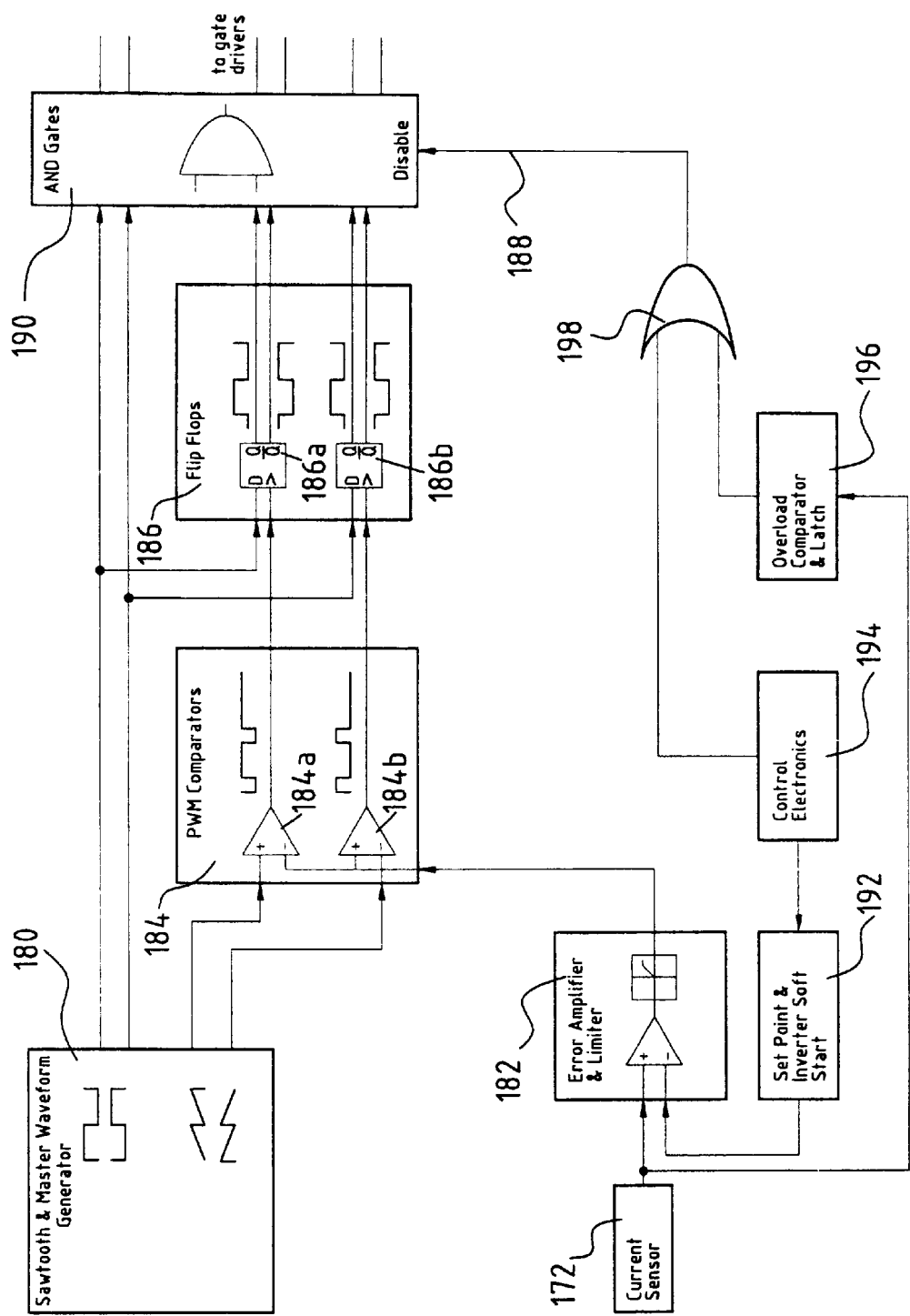
FIG. 6; is a schematic block diagram of the control board.

FIG. 6 shows a simplified schematic diagram of the control circuit 120, together with the current sensor 172.

The sawtooth and master waveform generator 180 generates two complementary phases of a master square waveform, serving as the timing reference signals for the IGBTs of reference phase A and two complementary phases of a sawtooth waveform. The two sawtooth waveforms are compared with the varying DC level ( ) produced by the error amplifier and limiter 182, in PWM comparators 184a, b resulting in the production of two pulse width modulated waveforms. These pulse width modulated waveforms and the two master waveforms are applied to a pair of flip-flops 186a, b. The output of the flip-flops respectively represent the controlling timing references signals for the pair of IGBTs for each of the phases B and C.

Figure 7:
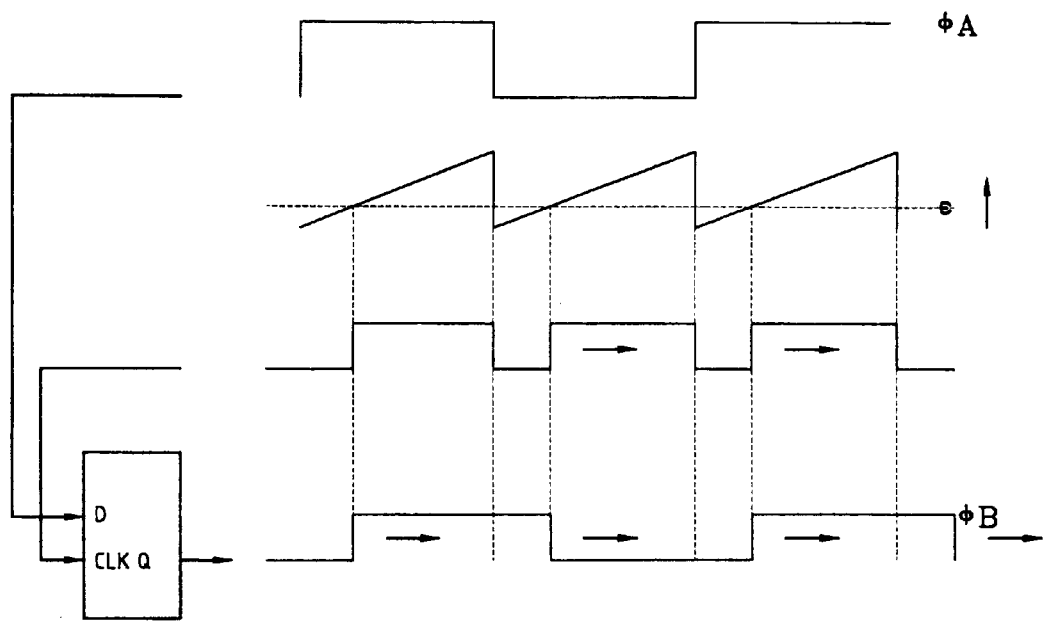
FIGS. 7 and 8 are timing wave forms for the gating signals for the switching devices of the inverter stage.
Figure 8:
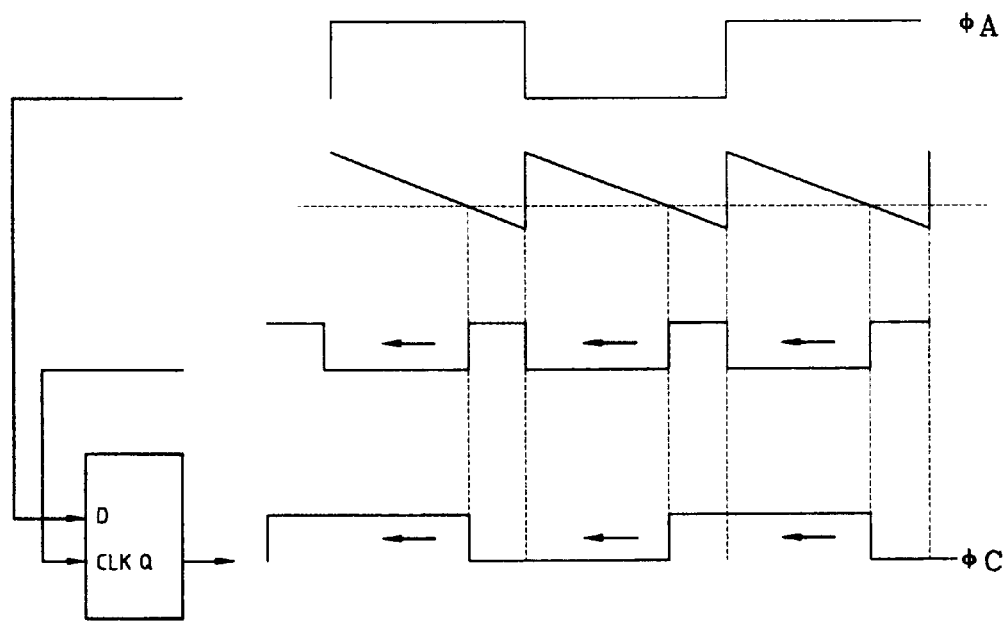

The waveforms within the flip-flop element 186 are shown in greater detail in FIGS. 7 and 8, that respectively relate to phases B and C. The output waveforms from the flip-flops 186a, b have the same period and duty cycle as the master waveform, but are retarded and advance respectively by a relative phase angle of between 0 and 120° according to the value of the error signal ( ), which may vary from zero to 5 V. The arrows indicated in FIGS. 7 and 8 show the effect of an increase in the error signal so far as how the waveforms would vary. As the amount of phase shift increases, so does the output voltage of the inverter 40, up to a maximum phase shift of 120°. Thus the error signal is limited to two thirds of the amplitude of the sawtooth waveform, that is to 3.3 V.

Each of the six IGBT timing signals is ANDed with a common "enable" line 188, thus providing a mechanism for inhibiting the inverter 40. This enabling/disabling can occur in two ways, firstly during the soft-start regime, wherein switching of the transistors 140 is inhibited until the soft start circuit 192 determines that the control circuitry has reached stable operation and the inrush period has passed, thus preventing the inverter entering damaging switching states during this period. Secondly, if the signal from the current sensor 172 exceeds a preset of the load level determined by the comparator and latch 196, the gate drivers will again be disabled. A simple OR gate 198 facilitates both protection regimes. The logic outputs from the AND gate element 190 are provided to the driver board 130 for level conversion, and so passed to the gate electrodes of the IGBT devices 140.

The signal from the current sensor 172 also is subtracted from a set point value derived from the set-point and inverter soft start element 192, with the result being amplified and low-pass filtered in the error amplifier and limiter 182 to provide the error signal ( ) that is limited to 3.3 V as discussed previously. The set point is a combination of a manually adjustable set point and timing capacitor, which ensures that whenever the inverter 40 starts-up, or is reset after a fault, it does so slowly. The set point signal to the error amplifier 182 thus ramps up from zero to the actual set point over a period of approximately 1 second.

Figure 9:
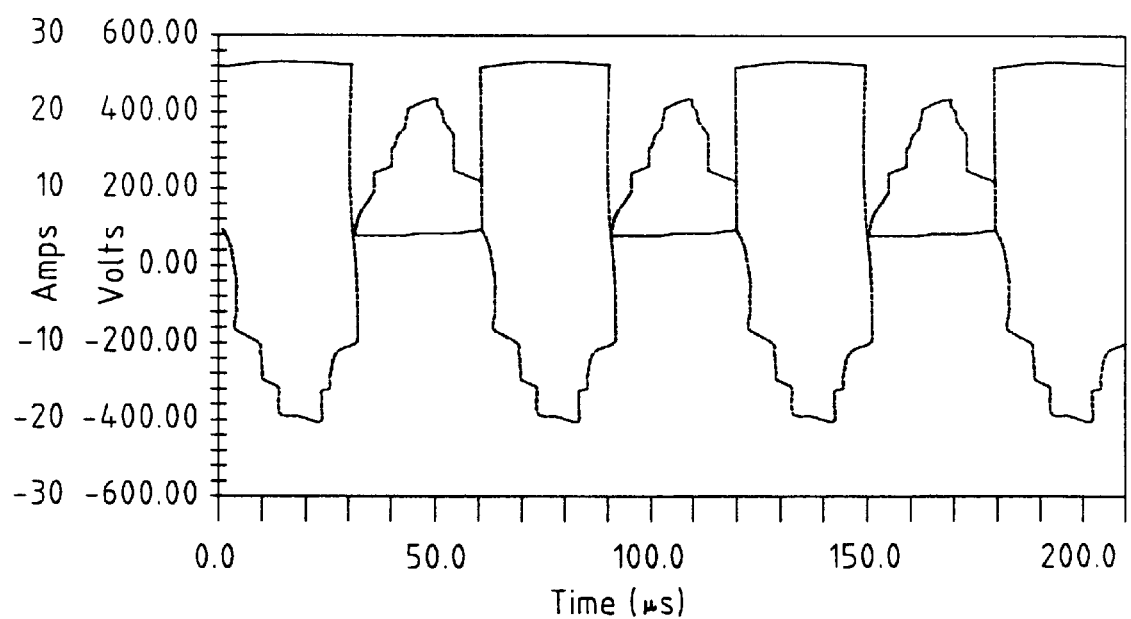
FIG. 9; shows voltage and current waveforms for an embodiment of the power supply.

FIG. 9 shows two waveforms measured in operation of the power supply 100 shown in FIG. 2. The figure shows measured drain-source voltage for one of the IGBT devices 140 (the square wave waveform) and the associated transformer primary phase current, where the power supply is operating at 250 A, 40 V.

Particular advantages of embodiments of the invention include the avoidance of the adverse effects of phase imbalances due to the use of a three phase mains supply. A soft-start regime practically eliminates inrush current upon stop-up. The transformer arrangement is lightweight and compact in nature compared with comparably power rated convention transformer arrangements. Furthermore, the three phase phase shift output control for the controlled inverter enables a wide range of output DC voltages to be obtained. The switching devices of the controlled inverter also are 'soft switched', reducing stresses on the semiconductor structures, improving the overall efficiency of the power supply and making possible the synthesis of high frequency pseudo AC outputs, in turn tending to allow a reduction in the physical size of the associated transformer.

Where in the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope of the appended claims.

I claim:

1. An AC-DC power supply comprising:
    a three phase rectifier circuit generating a first rectified output in response to an input voltage having an input voltage frequency;
    a controlled three phase inverter circuit receiving the first rectified output and generating a pseudo-AC three phase output having a frequency higher than the frequency of the three phase AC supply supplied to the rectifier circuit, wherein the pseudo-AC three phase output is controlled by means of phase shifting;
    a three phase transformer receiving said phase shift controlled pseudo-AC three phase output; and
    a second three phase rectifier circuit receiving the transformed pseudo-AC three phase output from said transformer and generating the output DC supply, wherein said three phase transformer comprises:
        three secondaries each formed from a conductive tube, said conductive tubes being substantially parallel and electrically connected at first end thereof;
        three transformer cores, each corresponding to a phase, each in the form of a cylindrical member threaded onto a corresponding said conductive tube; and
        three primary windings each corresponding to a phase, wound so as to pass through the interiors of adjacent pairs of said conductive tubes.

2. An AC-DC power supply as claimed in claim 1 wherein each said transformer core in the form of a cylindrical member formed from a plurality of ferrite discs, each disc having an aperture therein adapted to accommodate a corresponding cylinder.

3. An AC-DC power supply as claimed in claim 1 wherein said controlled three phase inverter circuit further includes a plurality of switching devices.

4. An AC-DC power supply as claimed in claim 1 wherein said controlled three phase inverter circuit includes switching devices in the form of power transistors.

5. An AC-DC power supply as claimed in claim 1 wherein said frequency of said pseudo-AC three phase output is substantially higher than the input voltage frequency.

6. An AC-DC power supply as claimed in claim 1 wherein said frequency of said pseudo-AC three phase output is greater than or equal to one order of magnitude higher than the input voltage frequency.

7. An AC-DC power supply as claimed in claim 1 wherein said pseudo-AC three phase output is greater than or equal to two orders of magnitude higher than the input voltage frequency.

8. A controllable three phase inverter circuit receiving a DC supply to produce a three phase pseudo AC output supply wherein the inverter comprises:
    a three leg bridge structure;
    each leg of said bridge structure comprising at least one controllable switching device;
    at least one switching device of one of said legs forming a phase reference; and
    wherein the voltage of the inverter circuit is controlled by means of phase shifting the relative phases of each signal carried by each leg.

9. A controllable three phase inverter circuit as claimed in claim 8 wherein the phase modulation is effected by said at least one switching device of one of the other two legs having the relative phase shift controlled with respect to the phase reference; and said at least one switching device of the third leg having the relative phase shift controlled with respect to the phase reference to increase the phase shift relative to the phase reference and thereby controlling the output voltage level of the inverter circuit.

10. A soft-switching three phase inverter circuit receiving a DC input supply and generating a pseudo AC three phase output supply wherein said inverter circuit comprises:

at least two switching devices per phase;

each said switching device having a capacitive element connected in parallel across it and each phase of the output supply including an inductive element;

a respective capacitive element and inductive element of each phase forming an LC resonant circuit; and wherein the turn-off of each said switching element is controlled to have a deadtime between switching phases during which time said LC resonant circuit causes the next sequential switching element that is to be turned on to have substantially zero voltage across it at the time of switching.

11. A method for controlling the output voltage of a three phase inverter circuit comprising the steps of:

assigning a first phase as a phase reference;

controlling the relative phase shift of one of the other two phases so that the phase difference between the first place and the one of the other two is reduced; and controlling the relative phase shift of the third phase so that the phase difference between the third phase and the first phase is increased.

12. An apparatus for the electrolysis of water to liberate hydrogen and oxygen gas, the apparatus comprising:

a cell unit having at least one cathode/anode electrode pair; and an AC-DC power supply comprising:

a three phase rectifier circuit generating a first rectified output in response to an input voltage;

a controlled three phase inverter circuit receiving the first rectified output and generating a pseudo three phase output having a frequency higher than the frequency of the three phase AC supply supplied to said rectifier circuit, wherein the pseudo-AC three phase output is controlled by means of phase shifting;

a three phase transformer receiving the phase shift controlled pseudo-AC three phase output; and a second three phase rectifier circuit receiving the transformed pseudo-AC three phase output from said transformer and generating the output DC supply, wherein said three phase transformer comprises:

three secondaries each formed from a conductive tube, said conductive tubes being substantially parallel and electrically connected at a first end thereof;

three transformer cores, each corresponding to a phase, each in the form of a cylindrical member threaded onto a corresponding said conductive tube; and three primary windings each corresponding to a phase, wound so as to pass through the interiors of adjacent pairs of said conductive tubes.

\* \* \* \* \*